United States Patent
Cheng et al.

(10) Patent No.: US 10,349,401 B2
(45) Date of Patent: Jul. 9, 2019

(54) BURST SLOT NUMBERING FOR LICENSED ASSISTED ACCESS

(71) Applicant: Telefonaktiebolaget LM Ericsson (publ), Stockholm (SE)

(72) Inventors: Jung-Fu Cheng, Fremont, CA (US);
Sorour Falahati, Stockholm (SE);
Havish Koorapaty, Saratoga, CA (US);
Daniel Larsson, Stockholm (SE);
Amitav Mukherjee, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 556 days.

(21) Appl. No.: 14/916,114

(22) PCT Filed: Jan. 22, 2016

(86) PCT No.: PCT/EP2016/051359
§ 371 (c)(1),
(2) Date: Mar. 2, 2016

(87) PCT Pub. No.: WO2016/120172
PCT Pub. Date: Aug. 4, 2016

(65) Prior Publication Data
US 2016/0360525 A1    Dec. 8, 2016

Related U.S. Application Data

(60) Provisional application No. 62/110,144, filed on Jan. 30, 2015.

(51) Int. Cl.
*H04W 72/04* (2009.01)
*H04W 72/14* (2009.01)
(Continued)

(52) U.S. Cl.
CPC ......... *H04W 72/0446* (2013.01); *H04L 5/001* (2013.01); *H04L 27/0006* (2013.01);
(Continued)

(58) Field of Classification Search
CPC ... H04L 27/0006; H04L 5/001; H04L 5/0041; H04W 16/14; H04W 72/0446;
(Continued)

(56) References Cited

U.S. PATENT DOCUMENTS

2004/0192201 A1*  9/2004  Febvre ............... H04B 7/2125
                                                      455/13.2
2011/0077038 A1*  3/2011  Montojo .............. H04B 7/024
                                                      455/507
(Continued)

OTHER PUBLICATIONS

Unknown Author, "Frame structure design for LAA considering LBT", 3GPP TSG RAN WG1 Meeting #79 R1-144828 San Francisco, USA Source ZTE, Nov. 17-21, 2014, 1-5.
(Continued)

*Primary Examiner* — Melvin C Marcelo
*Assistant Examiner* — Natali Pascual Peguero
(74) *Attorney, Agent, or Firm* — Sage Patent Group

(57) ABSTRACT

In one aspect of the teachings herein, a transmitter uses a burst numbering scheme to dynamically number the transmit slots comprising a burst transmission on a secondary carrier operated in unlicensed spectrum, where the secondary carrier is time aligned with a primary carrier that operates in licensed spectrum and uses a fixed numbering scheme for its transmit slots. By assigning the transmit slot numbers dynamically, the transmitter has foreknowledge of the transmit slot numbers of the transmit slots within the transmit burst, and can therefore carry out processing that is dependent on the transmit slot number(s) assigned to the transmit slots comprising the burst, even when the burst start time is variable. Correspondingly, a receiver also has foreknowledge of the transmit slot numbers associated with a received burst that was dynamically numbered by a transmitter according to a burst numbering scheme known to the receiver.

36 Claims, 14 Drawing Sheets

(51) Int. Cl.
*H04L 5/00* (2006.01)
*H04L 27/00* (2006.01)
*H04W 16/14* (2009.01)
*H04W 74/08* (2009.01)
*H04W 84/12* (2009.01)
*H04W 28/08* (2009.01)

(52) U.S. Cl.
CPC ....... *H04W 16/14* (2013.01); *H04W 72/0466* (2013.01); *H04W 72/14* (2013.01); *H04W 74/0808* (2013.01); *H04W 84/12* (2013.01); *H04L 5/0041* (2013.01); *H04W 28/08* (2013.01)

(58) Field of Classification Search
CPC ............. H04W 72/0466; H04W 72/14; H04W 74/0808; H04W 84/12; H04W 28/08
USPC .................................................. 370/322, 335
See application file for complete search history.

(56) References Cited

U.S. PATENT DOCUMENTS

| | | | |
|---|---|---|---|
| 2013/0176937 A1* | 7/2013 | Rolle | H04B 7/18528 370/322 |
| 2013/0315152 A1 | 11/2013 | Ratasuk et al. | |
| 2015/0334744 A1* | 11/2015 | Ji | H04W 74/0816 370/336 |

OTHER PUBLICATIONS

Unknown Author, "Listen Before Talk and Channel Access", 3GPP TSG RAN WG1 Meeting #78bis R1-144187 Ljubljana, Slovenia Source: Nokia Networks, Nokia Corporation, Oct. 6-10, 2014, 1-5.

3GPP, "3rd Generation Partnership Project; Technical Specification Group Radio Access Network; Evolved Universal Terrestrial Radio Access (E-UTRA); Physical channels and modulation (Release 11)", 3GPP TS 36.211 V11.4.0, Sep. 2013, 1-120.

3GPP, "3rd Generation Partnership Project; Technical Specification Group Radio Access Network; Evolved Universal Terrestrial Radio Access (E-UTRA); Physical channels and modulation (Release 12)", 3GPP TS 36.211 V12.3.0, Sep. 2014, 1-124.

3GPP, "3rd Generation Partnership Project; Technical Specification Group Radio Access Network; Evolved Universal Terrestrial Radio Access (E-UTRA); Physical layer procedures (Release 11)", 3GPP TS 36.213 V11.4.0, Sep. 2013, 1-182.

3GPP, "3rd Generation Partnership Project; Technical Specification Group Radio Access Network; Evolved Universal Terrestrial Radio Access (E-UTRA); Physical layer procedures (Release 12)", 3GPP TS 36.213 V12.3.0, Sep. 2014, 1-212.

3GPP, "3rd Generation Partnership Project; Technical Specification Group Radio Access Network; Evolved Universal Terrestrial Radio Access (E-UTRA); Radio Resource Control (RRC); Protocol specification (Release 11) the present", 3GPP TS 36.331 V11.5.0, Sep. 2013, 1-347.

* cited by examiner

BURST SLOT NUMBERING FOR LICENSED ASSISTED ACCESS

TECHNICAL FIELD

The present invention generally relates to communication networks, and particularly relates to carrier aggregation involving unlicensed frequency bands.

BACKGROUND

A Third Generation Partnership Project (3GPP) Release 13 (Rel-13) study item focuses on "Licensed-Assisted Access" (LAA) operation in Long Term Evolution (LTE) networks, which allows the LTE networks and related equipment to operate in the unlicensed 5 GHz radio spectrum. More particularly, the unlicensed 5 GHz spectrum is used as a complement to the licensed spectrum. Accordingly, devices connect in the licensed spectrum on a primary cell (PCell) and use carrier aggregation to benefit from additional transmission capacity provided by a secondary cell (SCell) operated in the unlicensed spectrum. To reduce the changes required for aggregating licensed and unlicensed spectrum, the LTE frame timing in the primary cell is simultaneously used in the secondary cell.

Regulatory requirements, however, may not permit transmissions in the unlicensed spectrum without prior channel sensing. Since the unlicensed spectrum must be shared with other radios of similar or dissimilar wireless technologies, a so-called Listen-Before-Talk (LBT) method needs to be applied. LBT involves sensing the medium for a pre-defined minimum amount of time and backing off if the channel is busy—such sensing may be referred to as a "clear channel assessment." Currently, the unlicensed 5 GHz spectrum is mainly used by equipment implementing the IEEE 802.11 Wireless Local Area Network (WLAN) standard. This standard is known under the WI-FI name.

Because of the need to wait for a clear channel, the first slot in which the LAA SCell or LAA user equipment (UE) is permitted to transmit cannot be predicted in advance. This uncertainty makes it difficult to pre-compute the data payloads for transmission, because several transmit parameters are dependent on the slot number in which data is transmitted.

LTE uses orthogonal frequency-division multiplex (OFDM) in the downlink and Discrete Fourier transform (DFT)-spread OFDM (also referred to as single-carrier frequency division multiple access or SC-FDMA) in the uplink. The basic LTE downlink physical resource can thus be seen as a time-frequency grid as illustrated in FIG. 1, where each resource element or RE corresponds to one OFDM subcarrier during one OFDM symbol interval. The uplink subframe has the same subcarrier spacing as the downlink and the same number of SC-FDMA symbols in the time domain as OFDM symbols in the downlink.

In the time domain, LTE downlink transmissions are organized into radio frames of 10 ms, each radio frame consisting of ten equally-sized subframes of length Tsubframe=1 ms as shown in FIG. 2. Each subframe comprises two slots of duration 0.5 ms each, and the slot numbering within a frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Downlink transmissions are dynamically scheduled, i.e., in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3.

From LTE Rel-11 onwards, the above described resource assignments can also be scheduled on the enhanced Physical Downlink Control Channel (EPDCCH). For Rel-8 to Rel-10 only Physical Downlink Control Channel (PDCCH) is available.

The reference symbols shown in the above FIG. 3 are cell specific reference symbols (CRS) and are used to support multiple functions, including fine time and frequency synchronization and channel estimation for certain transmission modes.

The generation of the baseband transmit signal on the physical shared channels for either the Downlink (DL) or Uplink (UL) generally involve scrambling, modulation mapping, layer mapping, precoding, and RE mapping. The specific baseband chain for the UL PUSCH is shown in FIG. 4 as an example. For PUSCH scrambling, the initialization of the scrambling sequence generator at the start of each subframe is a function of the current slot number ns. This is also true for PDSCH scrambling on the DL.

The LTE Rel-10 standard supports bandwidths larger than 20 MHz. One important requirement on LTE Rel-10 is to assure backward compatibility with LTE Rel-8. This compatibility should also include spectrum compatibility. Spectrum compatibility implies that an LTE Rel-10 carrier, wider than 20 MHz, should appear as a number of LTE carriers to an LTE Rel-8 terminal. Each such carrier can be referred to as a Component Carrier (CC). In particular, for early LTE Rel-10 deployments, there likely will be a smaller number of LTE Rel-10-capable terminals compared to many LTE legacy terminals. Therefore, it is necessary to ensure that legacy carriers operate efficiently with respect to wide carriers, i.e. that it is possible to implement carriers where legacy terminals can be scheduled in all parts of the wideband LTE Rel-10 carrier. The straightforward way to achieve this usage involves Carrier Aggregation (CA).

CA implies that an LTE Rel-10 terminal can receive multiple CCs, where the CCs have, or at least the possibility to have, the same structure as a Rel-8 carrier. CA is illustrated in FIG. 5. A CA-capable UE is assigned a PCell that is always activated, and one or more SCells that may be activated and deactivated dynamically. The number of aggregated CCs as well as the bandwidth of the individual CC may be different for uplink and downlink.

A symmetric configuration refers to the case where the number of CCs in downlink and uplink is the same, whereas an asymmetric configuration refers to the case that the number of CCs is different. It is important to note that the number of CCs configured in a cell may be different from the number of CCs seen by a terminal. A terminal may for example support more downlink CCs than uplink CCs, even though the cell is configured with the same number of uplink and downlink CCs.

In addition, a key feature of carrier aggregation is the ability to perform cross-carrier scheduling. This mechanism allows an (enhanced) physical downlink control channel or (E)PDCCH on one CC to schedule data transmissions on another CC by means of a 3-bit Carrier Indicator Field (CIF) inserted at the beginning of the (E)PDCCH messages. For data transmissions on a given CC, a UE expects to receive scheduling messages on the (E)PDCCH on just one CC—either the same CC, or a different CC via cross-carrier scheduling; this mapping from (E)PDCCH to PDSCH is also configured semi-statically.

In typical deployments of WLAN, carrier sense multiple access with collision avoidance (CSMA/CA) is used for medium access. This means that the channel is sensed to perform a clear channel assessment (CCA), and a transmission is initiated only if the channel is declared as Idle. In case the channel is declared as busy or occupied, the transmission is essentially deferred until the channel is deemed to be idle or clear. When the range of several access points (APs) using the same frequency overlap, this means that all transmissions related to one AP might be deferred in case a transmission on the same frequency to or from another AP which is within range can be detected. Effectively, this means that if several APs are within range, they will have to share the channel in time, and the throughput for the individual APs may be severely degraded. FIG. 6 provides a general illustration of the CCA operation, also referred to as a Listen-Before-Talk (LBT) mechanism.

One way to utilize unlicensed spectrum for LTE in a manner that is more reliable and more reflective of the need to coexist with other systems or devices sharing the unlicensed spectrum involves using the carrier(s) operating within licensed spectrum for the transmission of essential control signals and channels. FIG. 7 depicts an example of such an arrangement, where a UE is connected to a PCell in the licensed band and one or more SCells in the unlicensed band. In this application we denote a secondary cell in unlicensed spectrum as licensed-assisted access secondary cell (LAA SCell).

Using the LTE DL transmission as a first non-limiting example, the downlink physical channel is scrambled as follows as described in 3GPP TS 36.211. For each codeword q, the block of bits $b^{(q)}(0), \ldots, b^{(q)}(M_{bit}^{(q)}-1)$, where $M_{bit}^{(q)}$ is the number of bits in codeword q transmitted on the physical channel in one subframe, shall be scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i)=(b^{(q)}(i)+c^{(q)}(i))\mod 2$$

where the scrambling sequence $c^{(q)}(i)$ is given by clause 7.2 of TS 36.211. The scrambling sequence generator shall be initialized at the start of each subframe, where the initialization value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

where $n_{RNTI}$ corresponds to the RNTI associated with the PDSCH transmission as described in clause 7.1 3GPP TS 36.213.

It can be observed that the scrambling code sequence depends on the slot number ns. Other examples of slot-number dependent signal generation in the LTE system include Reference Symbols (RS), RS hopping, Physical Uplink Control Channel (PUCCH) cyclic shifts, etc.

Because of the LBT procedure, the first slot in which the LAA SCell or LAA UE is permitted to transmit cannot be predicted in advance. This fact in turn makes it difficult to pre-compute the data payload on physical channels, because several associated parameters such as scrambling, RS hopping, PUCCH cyclic shift etc., depend on the slot number in which data is transmitted. In other words, it is recognized herein that the same codeword will have to be continually re-scrambled for prospective transmission, for each slot that the LBT procedure is not successful.

SUMMARY

In one aspect of the teachings herein, a transmitter uses a burst numbering scheme to dynamically number the transmit slots comprising a burst transmission on a secondary carrier operated in unlicensed spectrum, where the secondary carrier is time aligned with a primary carrier that operates in licensed spectrum and uses a fixed numbering scheme for its transmit slots. By assigning the transmit slot numbers dynamically, the transmitter has foreknowledge of the transmit slot numbers of the transmit slots within the transmit burst, and can therefore carry out processing that is dependent on the transmit slot number(s) assigned to the transmit slots comprising the burst, even when the burst start time is variable. Correspondingly, a receiver also has foreknowledge of the transmit slot numbers associated with a received burst that was dynamically numbered by a transmitter according to a burst numbering scheme known to the receiver.

In an example, a communication node implements a method of performing a burst transmission on a secondary carrier that is operated in an unlicensed frequency band in aggregation with a primary carrier that is operated in a licensed frequency band. The transmit slots of the secondary carrier align with transmit slots of the primary carrier and the method includes dynamically numbering the transmit slots of the secondary carrier according to a burst numbering scheme that differs from a fixed numbering scheme used for numbering transmit slots of the primary carrier. The burst numbering scheme references transmit slot numbering to the first transmit slot of the secondary carrier that is used for transmission on the secondary carrier, after a successful clear channel assessment for the secondary carrier or a prior transmission burst. The method further includes determining, according to the burst numbering scheme, the transmit slot numbers that will be assigned to the transmit slots used on the secondary carrier for making the burst transmission, setting a slot-number dependent transmission parameter for making the burst transmission, based on the determined transmit slot numbers, and performing the burst transmission on the secondary carrier according to the slot-number dependent transmission parameter.

In a corresponding example embodiment, a communication node is configured for operation in a wireless communication network and is further configured to perform a burst transmission on a secondary carrier that is operated in an unlicensed frequency band in aggregation with a primary carrier that is operated in a licensed frequency band. As above, the transmit slots of the secondary carrier align with transmit slots of the primary carrier. The communication node comprises a communication interface and an operatively associated processing circuit. The processing circuit is configured to dynamically number the transmit slots of the secondary carrier according to a burst numbering scheme that differs from a fixed numbering scheme used for numbering transmit slots of the primary carrier. The burst numbering scheme references transmit slot numbering to the first transmit slot of the secondary carrier that is used for transmission on the secondary carrier, after a successful clear channel assessment for the secondary carrier or a prior transmission burst. The processing circuit is further configured to determine, according to the burst numbering scheme, the transmit slot numbers that will be assigned to the transmit slots used on the secondary carrier for making the burst transmission, set a slot-number dependent transmission parameter for making the burst transmission, based on the determined transmit slot numbers, and perform the burst transmission on the secondary carrier according to the slot-number dependent transmission parameter.

Another example method includes receiver-side processing operations that account for and complement the use of dynamic transmit slot numbering by a transmitter. A communication node implements the method, which includes receiving, from another communication node, a burst transmission on a secondary carrier that is operated in an unlicensed frequency band in aggregation with a primary carrier that is operated in a licensed frequency band. The transmit slots of the secondary carrier align with transmit slots of the primary carrier, and the other communication node dynamically numbers the transmit slots of the secondary carrier according to a burst numbering scheme that differs from a fixed numbering scheme used for numbering transmit slots of the primary carrier. The burst numbering scheme references transmit slot numbering to the first transmit slot of the secondary carrier that is used by the other communication node for transmission on the secondary carrier after a successful clear channel assessment for the secondary carrier or a prior transmission burst. The method further includes determining, according to the burst numbering scheme, the transmit slot numbers assigned by the other communication node to the transmit slots used on the secondary carrier for making the burst transmission, setting a slot-number dependent reception parameter for processing the received burst transmission, based on the determined transmit slot numbers, and processing the received burst transmission according to the slot-number dependent reception parameter.

In a corresponding example, a communication node is configured for operation in a wireless communication network and includes a communication interface and an operatively associated processing circuit. The communication interface is configured to receive, from another communication node, a burst transmission on a secondary carrier that is operated in an unlicensed frequency band in aggregation with a primary carrier that is operated in a licensed frequency band. The transmit slots of the secondary carrier align with transmit slots of the primary carrier, and the other communication node dynamically numbers the transmit slots of the secondary carrier according to a burst numbering scheme that differs from a fixed numbering scheme used for numbering transmit slots of the primary carrier.

The burst numbering scheme references transmit slot numbering to the first transmit slot of the secondary carrier that is used by the other communication node for transmission on the secondary carrier after a successful clear channel assessment for the secondary carrier or a prior transmission burst. Correspondingly, the processing circuit at the receiving communication node is configured to determine, according to the burst numbering scheme, the transmit slot numbers assigned by the other communication node to the transmit slots used on the secondary carrier for making the burst transmission, set a slot-number dependent reception parameter for processing the received burst transmission, based on the determined transmit slot numbers, and process the received burst transmission according to the slot-number dependent reception parameter.

Of course, the present invention is not limited to the above features and advantages. Indeed, those skilled in the art will recognize additional features and advantages upon reading the following detailed description and upon viewing the accompanying drawings.

DETAILED DESCRIPTION

The teachings herein disclose several example embodiments of burst numbering schemes employed on a Licensed Assisted Access (LAA) secondary carrier in transmission bursts. These burst numbering schemes dynamically number the transmit slots of transmit bursts and therefore enable the involved transmitter and receiver to know the slot numbers that will be assigned to the transmit slots comprising a given burst, even if the actual start time of the burst has an unknown variability. As a consequence, the involved transmitter and receiver advantageously have foreknowledge of the involved transmit slot numbers, even in cases where the burst start is deferred until after a successful LBT/CCA operation or a prior transmission burst. The burst slot numbering can be used on the Downlink (DL) and on the Uplink (UL) on the LBT carrier, for both Frequency Division Duplex (FDD) and Time Division Duplex (TDD) systems. The teachings herein further apply to standalone operation on a LBT carrier.

Figure 1:
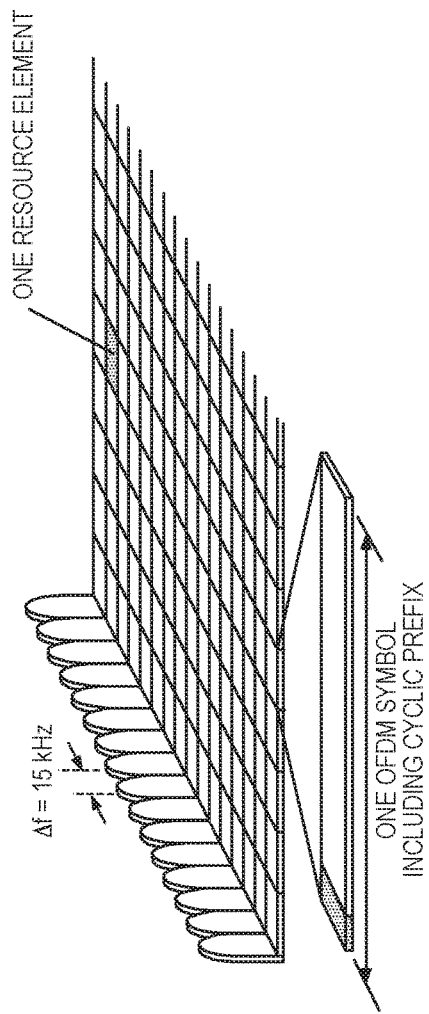
FIG. 1 is a diagram of a known arrangement of physical resources in Long Term Evolution (LTE).
Figure 2:
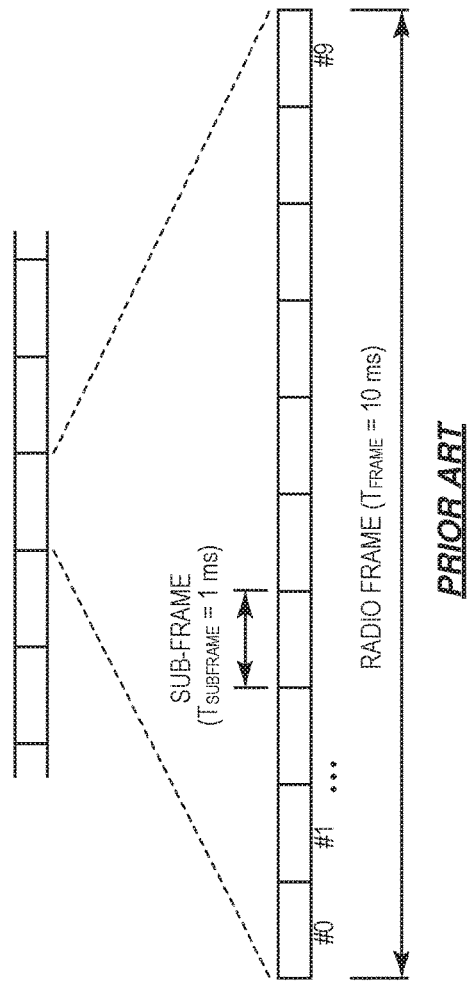
FIG. 2 is a diagram of a known arrangement of radio frames and subframes in LTE.
Figure 3:
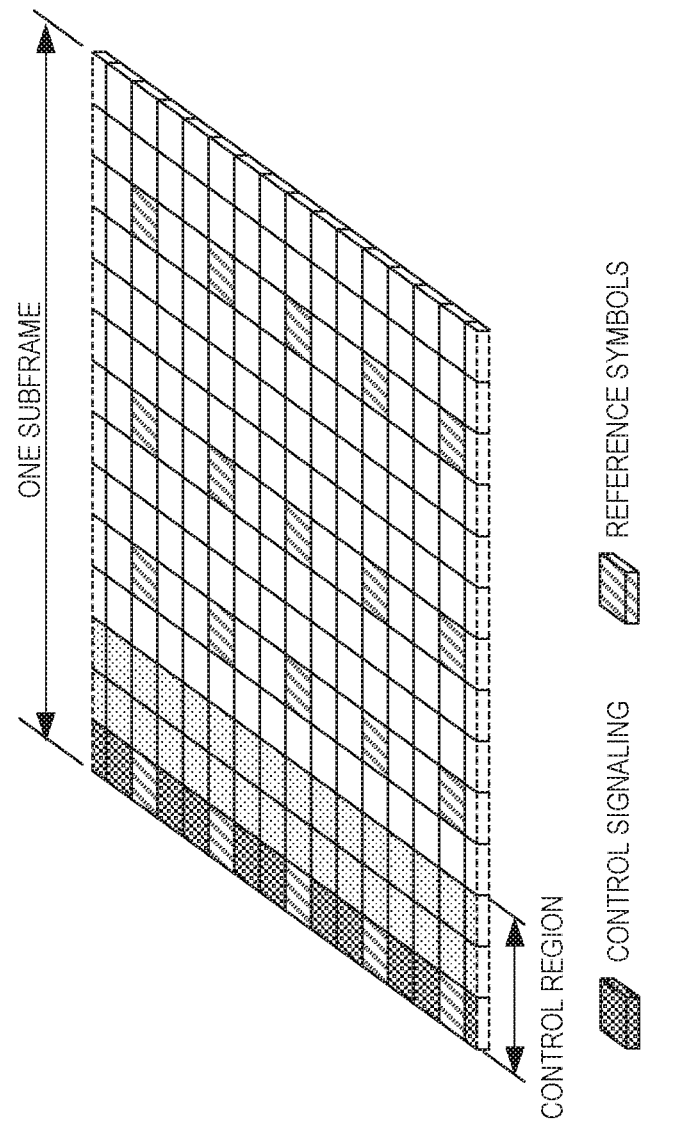
FIG. 3 is a diagram of a known arrangement of a downlink subframe in LTE.
Figure 4:
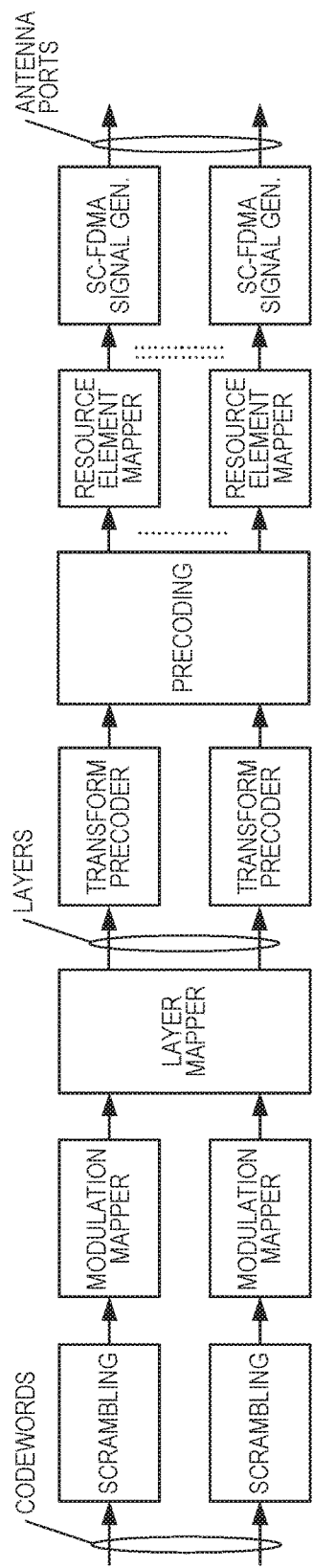
FIG. 4 is a diagram of a known arrangement for baseband processing of an uplink signal, for transmission in LTE.
Figure 5:
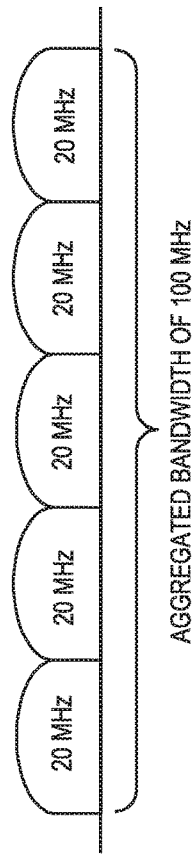
FIG. 5 is a diagram of a known arrangement for Carrier Aggregation (CA).
Figure 6:
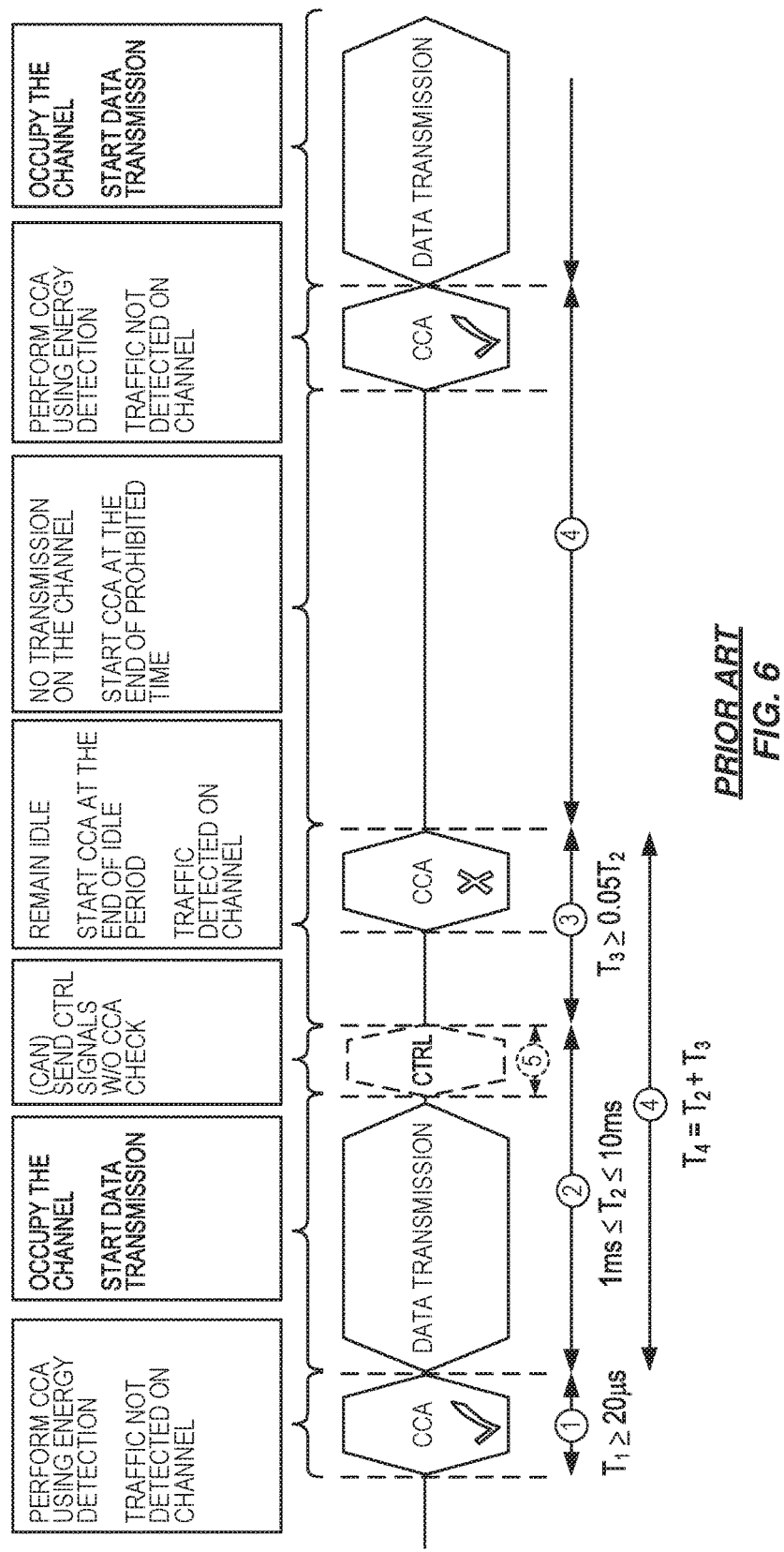
FIG. 6 is a diagram of a known methodology for performing a Listen-Before-Talk (LBT) operation on a radio channel.
Figure 7:
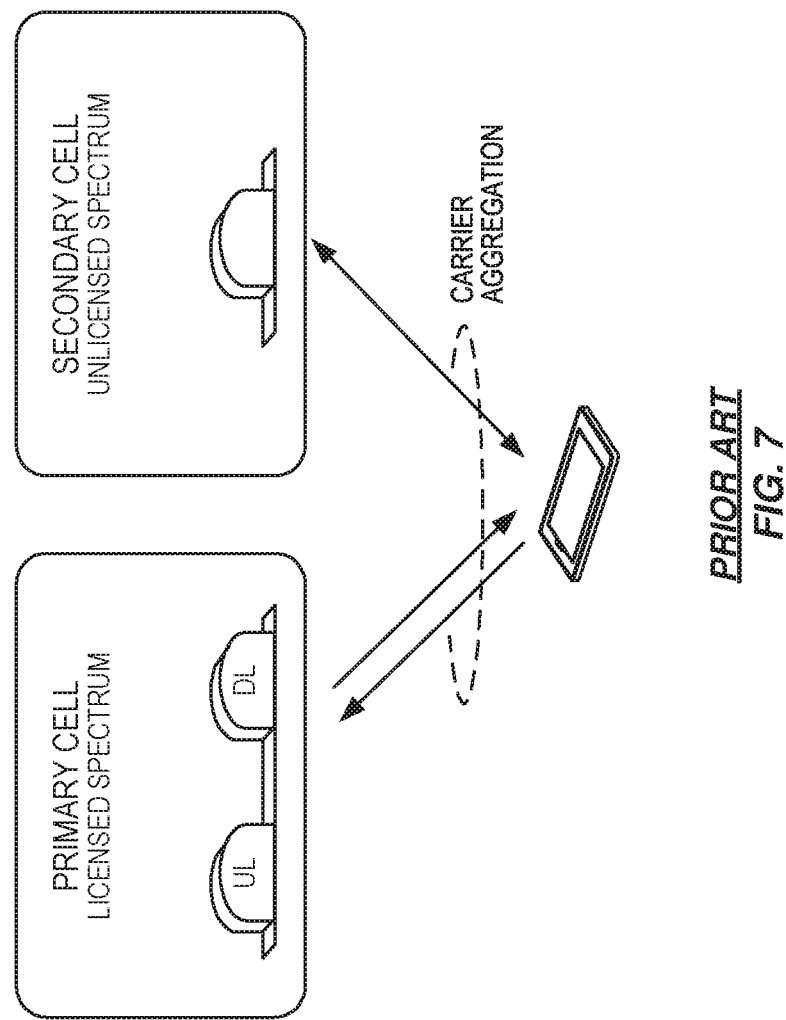
FIG. 7 is a diagram of a known arrangement for License Assisted Access (LAA) operation of a wireless device in a LTE network.
Figure 8:
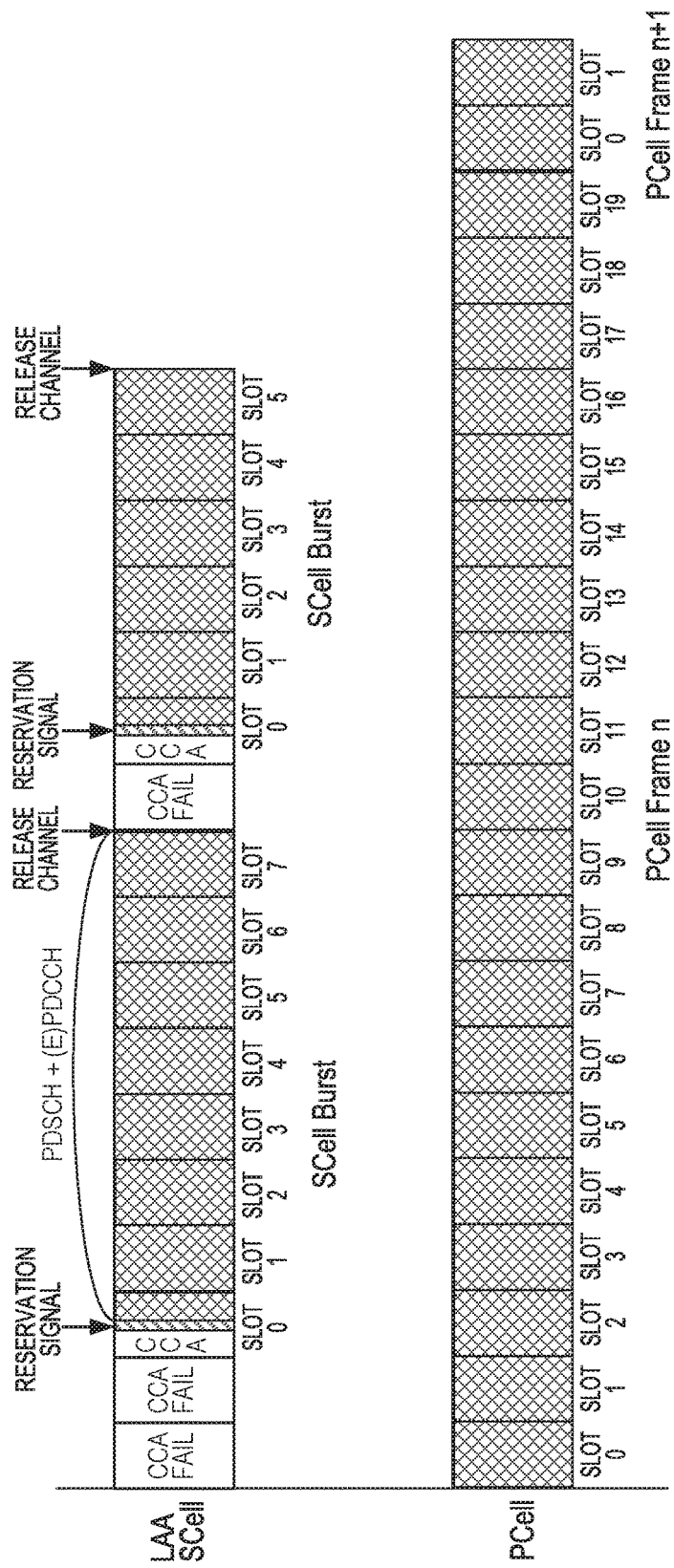
FIG. 8 is a diagram of one embodiment of burst slot numbering in a downlink context.

FIG. 8 illustrates a first example embodiment for burst transmissions on the DL. The corresponding context assumes that the secondary carrier used in the LAA SCell follows subframe alignment with the primary carrier used in the licensed PCell, and assumes that the maximum allowed duration of a LAA transmission burst is 4 ms or 8 slots. The PCell follows legacy slot numbering where within each frame, the twenty slots are numbered from 0 to 19. On the other hand, the LAA SCell follows burst slot numbering, where slot number ns=0 is assigned to the first slot containing LAA SCell data transmission after a successful CCA or extended CCA. Subsequent slots within the LAA transmission burst are numbered consecutively. Slots in which CCA sensing is performed or which occur during a backoff or defer duration are not explicitly assigned a slot number.

Reservation signals may be transmitted to a receiver. A reservation signal, for example, indicates to a receiver the slot number assigned for the first slot of a transmission burst. In some examples, a reservation signal is transmitted to the receiver immediately after a successful CCA. In other examples, a reservation signal may not be transmitted immediately after a successful CCA. The reservation signal may be a synchronization signal or other signal that is already used in the applicable air interface protocol, and it may be used to hold or reserve the channel. In any case, a communication node, such as a network node, capable of operating multiple LAA DL SCells can apply burst slot numbering independently for the respective DL SCell transmissions.

Figure 9:
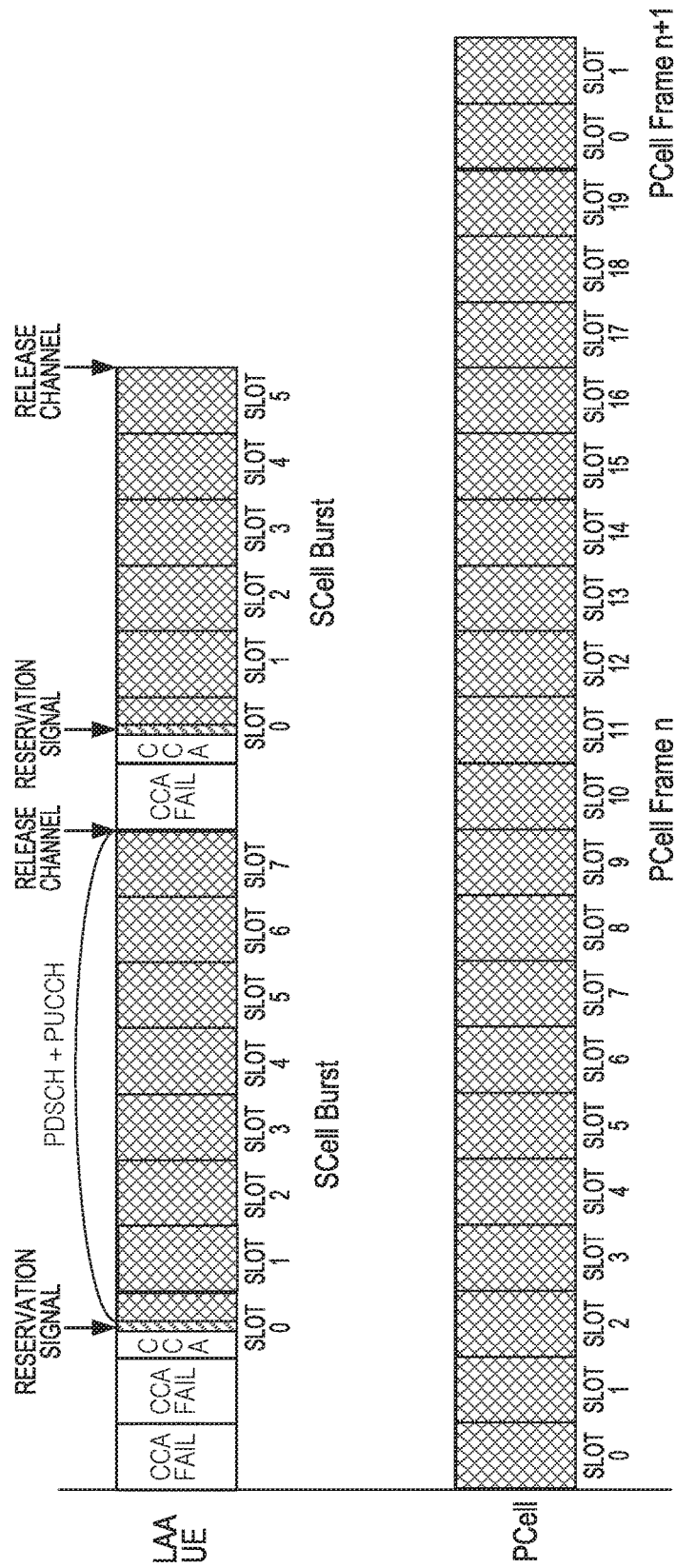
FIG. 9 is a diagram of another embodiment of burst slot numbering in the uplink context.

FIG. 9 illustrates a second embodiment, set in the context of LAA UL. Here, the burst slot numbering is applied by a communication node, such as a user equipment (UE), for UL transmissions on the LAA SCell. Slot number ns=0 is assigned to the first slot containing LAA UL data transmission after a successful CCA or extended CCA. As an example, the maximum allowed duration of a LAA transmission burst is assumed to be 4 ms (8 slots). The PCell follows legacy slot numbering where within each frame, the twenty slots are numbered from 0 to 19. In some examples, a reservation signal is transmitted immediately after a successful CCA. In other examples, a reservation signal may not be transmitted immediately by the UE after a successful CCA.

Figure 10:
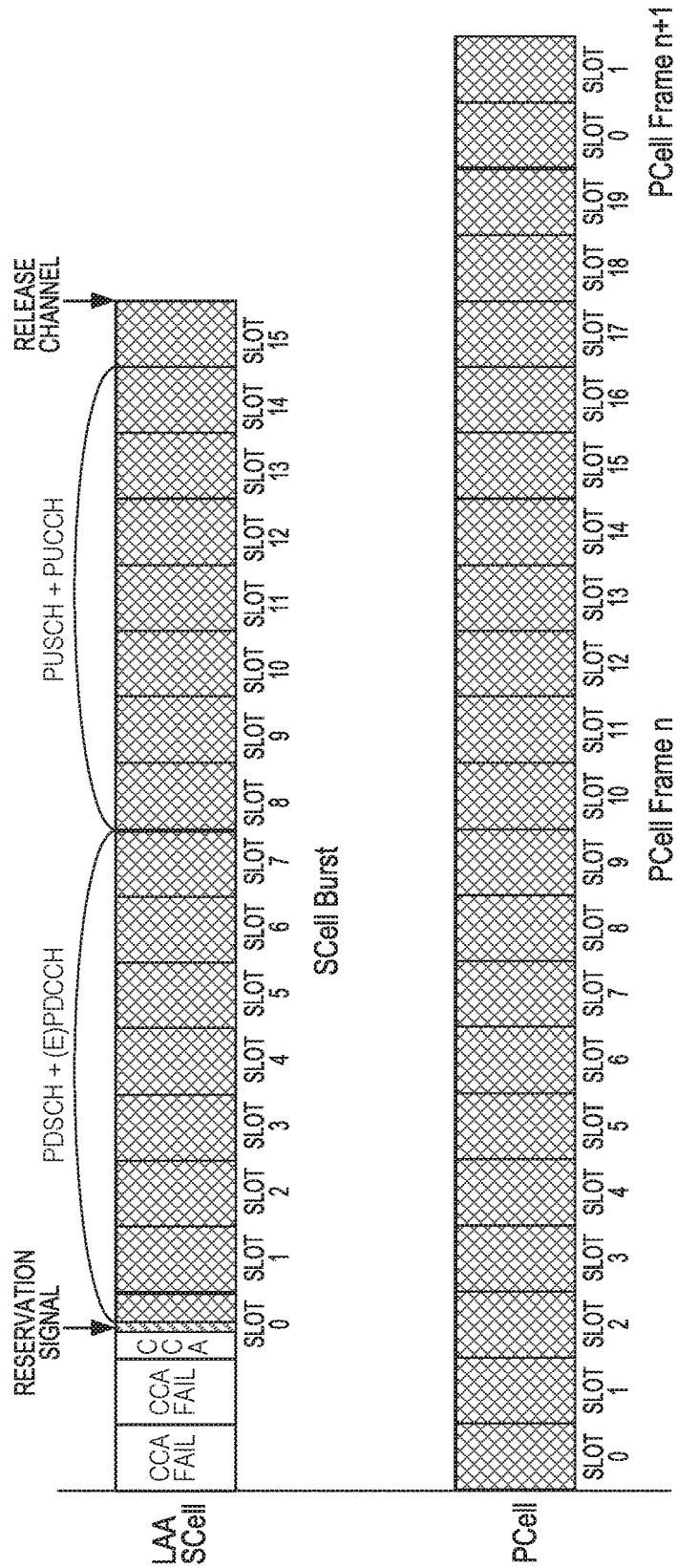
FIG. 10 is a diagram of another embodiment of burst slot numbering in the uplink context.
Figure 11:
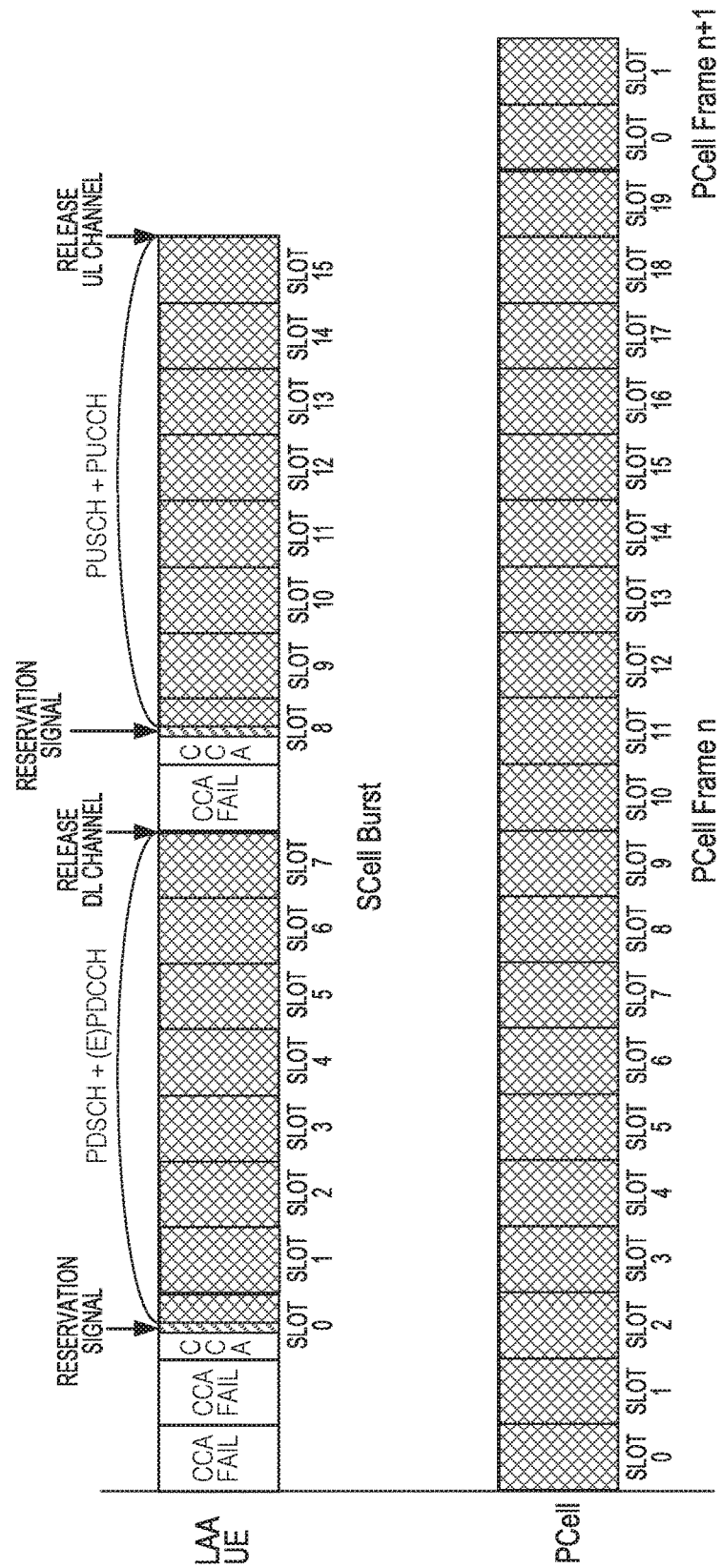
FIG. 11 is a diagram of yet another embodiment of burst slot numbering in the uplink context.

FIGS. 10 and 11 illustrate a third embodiment for the LAA UL context, where the burst slot numbering for the UL transmissions is continued from that used for a preceding DL transmission. In this exemplary illustration, it is assumed that the maximum allowed duration of LAA DL and UL transmission bursts is 8 ms (8 slots). The PCell follows legacy slot numbering where within each frame, the twenty slots are numbered from 0 to 19. On the other hand, the LAA SCell follows burst slot numbering, where slot number ns=0 is assigned to the first slot containing LAA SCell DL data transmission after a successful CCA or extended CCA. Subsequent slots within that LAA DL transmission burst are numbered consecutively. The first slot in the LAA UL transmission burst is numbered with the next slot number following the last burst slot number of the DL transmission. Subsequent slots within that LAA DL transmission burst are numbered consecutively.

In other words, the dynamic numbering applied to transmit slots of the UL transmit burst that follows the DL transmission continue the incremental slot numbering used for the DL transmission. A UE following this embodiment knows the slot number(s) for its UL transmission because they can be computed based on when the UL grant is received from the network node and knowledge of the applicable grant delay. For example, the LTE protocol specifies a 4 ms delay between the UL grant and the start of the corresponding UL transmission. Such an embodiment applies to LAA UL transmissions following a successful CCA performed by the UE and to LAA UL transmissions by the UE without performing a CCA.

In a fourth embodiment, the aspects described above are applicable at the receiver side to determine the slot numbering applied by a transmitter. The slot numbering applied by the transmitter may be determined in a number of ways. In a first example, blind detection is performed by a receiver of a burst transmission that was dynamically numbered by the transmitter. In such a case, the receiver monitors the channel and correlates the received signal in the OFDM symbols within a slot with a known signal or reference signal that was generated based on an assigned slot number, such as a predetermined slot number like zero. When a peak is observed at the output of the correlator, the transmitter marks that slot as the slot number zero and numbers the following slots accordingly.

It is also contemplated herein to provide assistance data to a receiver, to aid the receiver in determining the slot numbers used for numbering the transmit slot(s) of a dynamically numbered burst transmission. For example, where a UE receives dynamically-numbered transmit bursts in an SCell, the associated PCell can be used to provide assistance data indicating the slot numbering to the UE.

Figure 12:
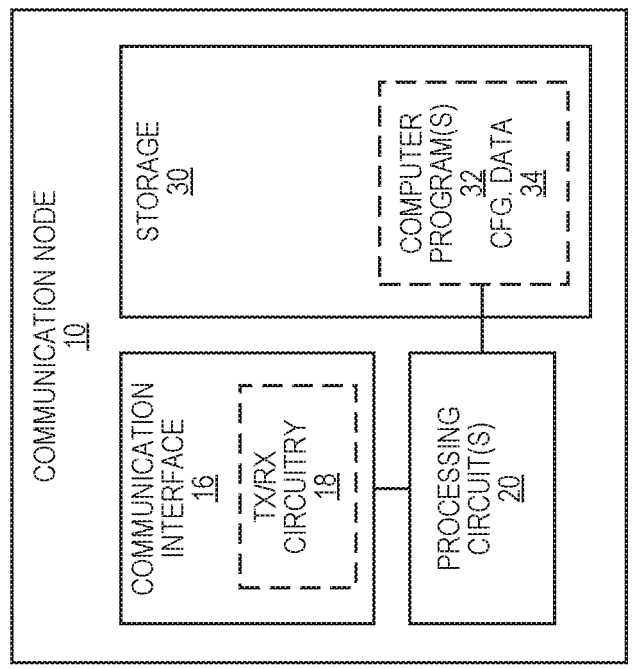
FIG. 12 is a block diagram of one embodiment of a communication node configured to implement a burst slot numbering scheme.

FIG. 12 illustrates, according to some embodiments, a block diagram of a communication node 10, which is configured for implementing burst slot numbering schemes, according to one or more embodiments. The communication node 10 is configured for operation in a wireless communication network and further configured to perform a burst transmission on a secondary carrier that is operated in an unlicensed frequency band in aggregation with a primary carrier that is operated in a licensed frequency band. The primary carrier may be a non-LAA carrier and the secondary carrier may be an LAA carrier.

The communication node 10 includes a communication interface 16 having, for example, transmission and reception (Tx/Rx) circuitry 18, such as cellular radio transceiver circuitry. The communication node 10 also includes storage 30 that provides non-transitory storage for one or more computer programs 32 and/or configuration data 34. The computer program 32 may be executed on one or more processing circuits 20, which are referred to as "the processing circuit 20" for convenience. By such program execution, the processing circuit 20 is configured to carry out one or more burst numbering schemes as described herein.

Broadly, the processing circuit 20 comprises fixed circuitry, programmed circuitry, or some combination of fixed and programmed circuitry. In an example embodiment, the processing circuit 20 comprises one or more microprocessors, Field Programmable Gate Arrays (FPGAs), Digital Signal Processors (DSPs), Application Specific Integrated Circuits (ASICs), or other digital processing circuitry. Further, the storage 30 comprises, for example, one or more types of memory or storage devices, such as DRAM or SRAM for working memory, and FLASH, EEPROM, or Solid State Disk (SSD) for longer-term data and program storage.

Regardless of its particular implementation, the communication node 10 in one or more embodiments is configured for operation in a wireless communication network and further configured to perform a burst transmission on a secondary carrier that is operated in an unlicensed frequency band in aggregation with a primary carrier that is operated in a licensed frequency band. The transmit slots of the secondary carrier align with transmit slots of the primary carrier, and the communication node 10 includes a communication interface 16 and a processing circuit 20. The communication interface 16 is configured for transmitting at least on the secondary carrier, and the processing circuit 20 is operatively associated with the communication interface.

The processing circuit 20 is configured to dynamically number the transmit slots of the secondary carrier according to a burst numbering scheme that differs from a fixed numbering scheme used for numbering transmit slots of the primary carrier. The burst numbering scheme references transmit slot numbering to the first transmit slot of the secondary carrier that is used for transmission on the secondary carrier, after a successful clear channel assessment for the secondary carrier or a prior transmission burst. That is, in one or more embodiments, the communication node 10 will start the burst transmission in the first transmit slot following a clear channel assessment, or in the first transmit slot following a prior transmit burst, and it will number the involved transmit slots according to the burst numbering scheme. Consequently, the communication node 10 knows the transmit slot numbers of the burst transmission, even if the actual start time of the burst transmission is subject to variation, e.g., the communication node 10 must wait until the secondary carrier is clear for transmission, or must wait until completion of the prior burst.

The processing circuit 20 is configured to determine, according to the burst numbering scheme, the transmit slot numbers that will be assigned to the transmit slots used on the secondary carrier for making the burst transmission, set a slot-number dependent transmission parameter for making the burst transmission, based on the determined transmit slot numbers, and perform the burst transmission on the secondary carrier according to the slot-number dependent transmission parameter. The slot-number dependent transmission parameter comprises, for example, a scrambling sequence, and the processing circuit 20 is configured to pre-compute payload data for the burst transmission based on foreknowledge of the scrambling sequence, as gained from the determined transmit slot numbers.

Figure 15:
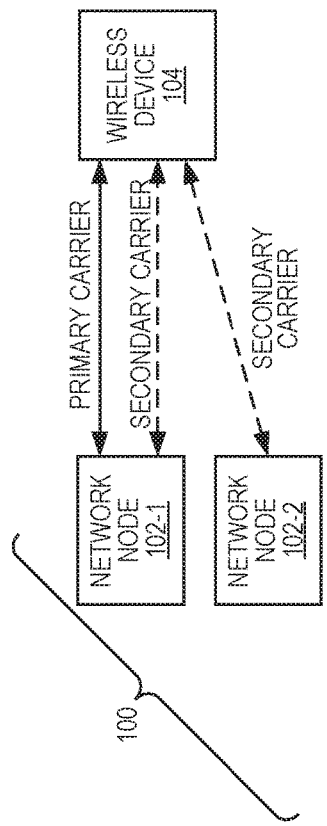
FIG. 15 is a block diagram of network nodes and wireless devices, configured for operation with Carrier Aggregation (CA) and burst slot numbering on a secondary carrier or carriers.

In one or more embodiments, the processing circuit 20 is configured to dynamically number the transmit slots of the secondary carrier according to the burst numbering scheme, based on being configured to, responsive to the successful clear channel assessment, reset the transmit slot numbering to a starting value, assign the starting value to the first transmit slot of the secondary carrier used for the burst transmission, and assign consecutively-incremented values to any subsequent transmit slots used for the burst transmission. With momentary reference to FIG. 15, when the communication node 10 comprises a network node 102 of a wireless communication network 100, the burst transmission is a DL transmission, and when the communication node 10 comprises a wireless device 104—also referred to as a UE—of the wireless communication network 100, the burst transmission is a UL transmission. By way of example, the wireless communication network 100 provides cellular communication services and is operated according to any one or more of the following Third Generation Partnership Project (3GPP) cellular standards: GSM, GPRS, WCDMA, HSDPA, LTE and LTE-Advanced.

Consider the case where the communication node 10 in question is a wireless device 104 operating in a wireless communication network 100, and where the burst transmission is a UL burst transmission beginning in a transmit slot of the secondary carrier that follows completion of a downlink burst transmission on the secondary carrier—here, "follows" does not necessarily connote the immediately following slot. In some embodiments for such a context, the processing circuit 20 is configured to dynamically number the transmit slots of the secondary carrier according to the burst numbering scheme by assigning slot numbers to the transmit slots of the uplink burst transmission that continue an incremental slot numbering used for the downlink burst transmission. In other scenarios and/or in some other embodiments, the processing circuit 20 is configured to perform the burst transmission on the secondary carrier according to the slot-number dependent transmission parameter by performing one or more clear channel assessments for the secondary carrier and beginning transmission of the burst transmission in the first slot of the secondary carrier following a determination that the secondary carrier is clear.

In at least one embodiment, where the communication node 10 is configured as a wireless device 104 for operation in a wireless communication network 100, and where the burst transmission in question is an uplink burst transmission on the secondary carrier, the processing circuit 20 is configured to dynamically number the transmit slots of the secondary carrier according to the burst numbering scheme, based on being configured to: receive an uplink grant for performing the uplink burst transmission; assign a starting slot number to the transmit slot of the secondary carrier in which the transmission of the uplink grant started; compute the number of transmit slots spanned by a known grant delay, where the grant delay specifies the delay from receiving the uplink grant to starting the uplink burst transmission; and assign the first transmit slot of the uplink burst transmission with the next incremental value in a numbering sequence that starts with the starting slot number and increments for each of the transmit slots spanned by the known grant delay, and assign successively incremented values to any further transmit slots used for the uplink burst transmission.

In any one or more of the various embodiments, the communication node 10 may be configured with a node-specific offset that it uses to determine the starting value used for the first transmit slot of a dynamically-numbered transmit slot. For example, the communication node 10 is one among a number of like or similarly configured wireless devices 104 operating in the same cell of a wireless network 100. By using a different offset value at each of the wireless devices 104, each wireless device 104 could employ the same dynamic transmit slot numbering scheme or schemes, and still use different transmit slot numbers for given uplink transmit bursts, as a consequence of operating with different offset values for setting the starting value. Such an approach reduces interference between the wireless devices 104, e.g., with respect to a receiving network node 102.

Figure 13:
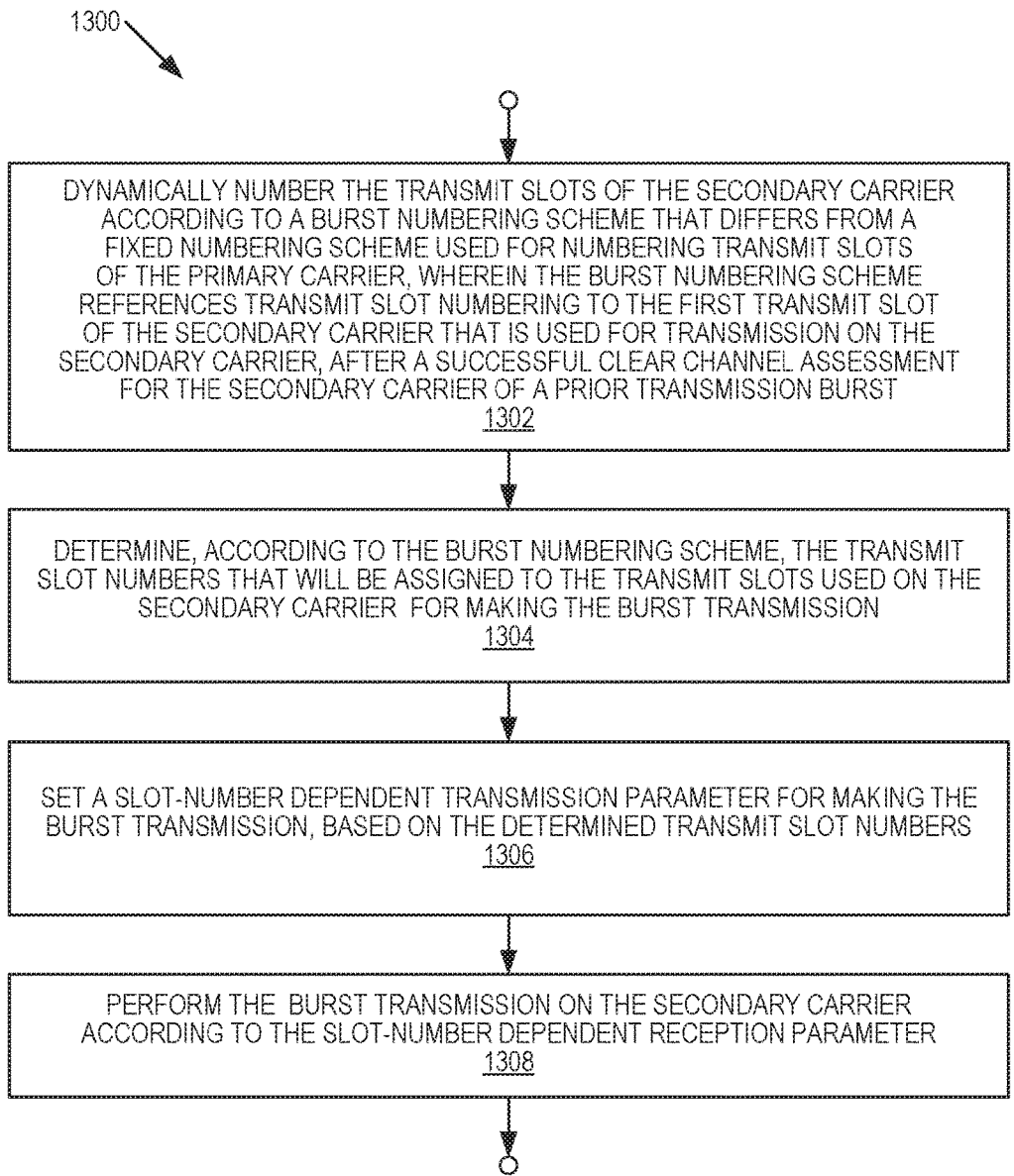
FIG. 13 is a logic flow diagram of one embodiment of a method of burst slot numbering and corresponding transmission parameter setting by a transmitting node.

FIG. 13 illustrates one embodiment of a method 1300, which method may be performed by the communication node of FIG. 12. The method 1300 is directed to performing a burst transmission on a secondary carrier that is operated in an unlicensed frequency band in aggregation with a primary carrier that is operated in a licensed frequency band, and wherein transmit slots of the secondary carrier align with transmit slots of the primary carrier.

The method 1300 includes dynamically numbering (Block 1302) the transmit slots of the secondary carrier according to a burst numbering scheme that differs from a fixed numbering scheme used for numbering transmit slots of the primary carrier. Here, the burst numbering scheme references transmit slot numbering to the first transmit slot of the secondary carrier that is used for transmission on the secondary carrier, after a successful clear channel assessment for the secondary carrier or a prior transmission burst. The method 1300 further includes determining (Block 1304), according to the burst numbering scheme, the transmit slot numbers that will be assigned to the transmit slots used on the secondary carrier for making the burst transmission, setting (Block 1306) a slot-number dependent transmission parameter for making the burst transmission, based on the determined transmit slot numbers, and performing (Block 1308) the burst transmission on the secondary carrier according to the slot-number dependent transmission parameter.

In an example implementation of the method 1300, the first transmit slot of a given burst transmission may be assigned a slot number of zero. In another example, the first transmit slot may be assigned a number relative to another slot number, such as a number immediately following a last transmit slot of a preceding transmission. For example, a downlink transmitter may perform the clear channel assessment, perform a downlink burst transmission on the secondary carrier, and number the transmit slots of the burst downlink transmission by assigning a starting value to the first slot of the downlink burst transmission and assign consecutively-incremented values to the remaining slots of the downlink burst transmission. Correspondingly, an uplink transmitter may perform an uplink burst transmission that begins in the first transmit slot after the last transmit slot of the downlink burst transmission. Advantageously, the uplink transmitter also follows the burst numbering scheme by numbering the transmit slots of the uplink transmit burst using a continuation of the transmit slot number sequence used for the downlink burst transmission.

While the above details focus on transmit-side operations of an example communication node 10, it should be appreciated that, in one or more embodiments, the same or another communication node 10 is configured to perform advantageous receiver-side operations that are complementary with respect to the transmit-side dynamic burst numbering scheme described above.

Accordingly, in one or more embodiments, a communication node 10 is configured for operation in a wireless communication network 100 and comprises a communication interface 16 configured to receive, from another communication node 10, a burst transmission on a secondary carrier that is operated in an unlicensed frequency band in aggregation with a primary carrier that is operated in a licensed frequency band. Here, the transmit slots of the secondary carrier align with transmit slots of the primary carrier, and the other communication node 10 dynamically numbers the transmit slots of the secondary carrier according to a burst numbering scheme that differs from a fixed numbering scheme used for numbering transmit slots of the primary carrier. Further, the burst numbering scheme references transmit slot numbering to the first transmit slot of the secondary carrier that is used by the other communication node 10 for transmission on the secondary carrier after a successful clear channel assessment for the secondary carrier or a prior transmission burst.

In this context, the processing circuit 20 is configured to determine, according to the burst numbering scheme, the transmit slot numbers assigned by the other communication node 10 to the transmit slots used on the secondary carrier for making the burst transmission, set a slot-number dependent reception parameter for processing the received burst transmission, based on the determined transmit slot numbers, and process the received burst transmission according to the slot-number dependent reception parameter. For example, the slot-number dependent reception parameter comprises a scrambling sequence, and the processing circuit 20 is configured to process the received burst transmission by descrambling payload data from each transmit slot of the received burst transmission according to the scrambling sequence.

In at least some embodiments, the processing circuit 20 is configured to determine, according to the burst numbering scheme, the transmit slot numbers assigned by the other communication node 10 to the transmit slots used on the secondary carrier for making the burst transmission, by setting the transmit slot numbering to a starting value, assigning the starting value to the first transmit slot of the secondary carrier used for the burst transmission, and assigning consecutively-incremented values to any subsequent transmit slots used for the burst transmission. If the communication node 10 in question comprises a network node 102, the burst transmission is an uplink transmission received at the network node 102. If the communication node 10 comprises a wireless device 104, the burst transmission is a downlink transmission received at the wireless device 104.

In an example, the communication node 10 is a network node 102, and the burst transmission is an uplink burst transmission from a wireless device 104 beginning in a transmit slot of a secondary carrier that follows completion of a downlink burst transmission on the secondary carrier. Here, the processing circuit 20 is configured to determine, according to the burst numbering scheme, the transmit slot numbers assigned by the wireless device 104 to the transmit slots used on the secondary carrier for making the uplink burst transmission by referencing the transmit slot numbers to a starting value assigned to the first transmit slot of the downlink burst transmission, such that the slot number assigned to the first transmit slot of the uplink burst transmission continues the incremental slot numbering used for the downlink burst transmission.

In another scenario or embodiment, the burst transmission is an uplink burst transmission transmitted by a wireless device 104 on the secondary carrier, and the processing circuit 20 is configured to determine, according to the burst numbering scheme, the transmit slot numbers assigned by the wireless device 104 to the transmit slots used on the secondary carrier for making the uplink burst transmission. In particular, the processing circuit 20 is configured to: assign a starting slot number to the transmit slot of the secondary carrier in which the transmission of the uplink grant started; compute the number of transmit slots spanned by a known grant delay, where the grant delay specifies the delay from the wireless device 104 receiving the uplink grant to the wireless device 104 starting the uplink burst transmission; and assign the first transmit slot of the uplink burst transmission with the next incremental value in a numbering sequence that starts with the starting slot number and increments for each of the transmit slots spanned by the known grant delay, and assign successively incremented values to any further transmit slots used for the uplink burst transmission.

Further, in at least some embodiments, the processing circuit 20 is configured to receive the burst transmission, based on being configured to: receive a signal containing the burst transmission; correlate the received signal with a comparison signal that is characteristic of the burst transmission; and determine that the received signal contains the burst transmission, based on correlation results obtained from the correlating step. The processing circuit 20 in at least one such embodiment is configured to identify a starting or first transmit slot of the burst transmission, based on the correlation results. Further, in at least one such embodiment, the processing circuit 20 is configured to correlate the received signal with a reservation signal that is characteristically transmitted by the other communication node 10 in association with initiating or making burst transmissions on the secondary carrier. The reservation signal comprises, for example, at least one of: a Cell Reference Signal (CRS), a Primary Synchronization Signal (PSS), and a Secondary Synchronization Signal (SSS).

Figure 14:
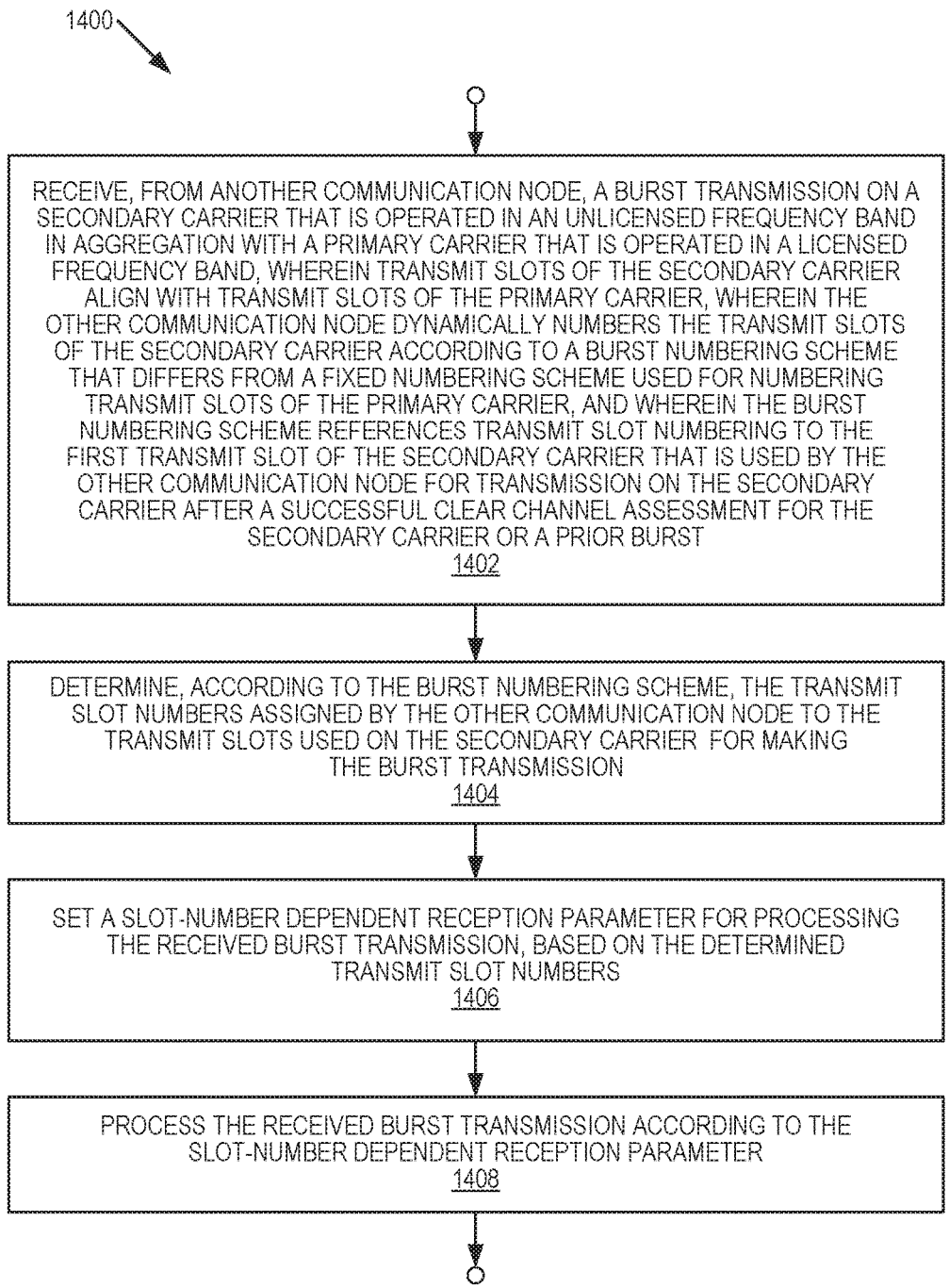
FIG. 14 is a logic flow diagram of one embodiment of a method of burst slot numbering and corresponding reception parameter setting by a receiving node.

FIG. 14 illustrates an example method 1400, corresponding to the receiver-mode operations of an example communication node 10, with respect to receiving a burst-mode transmission from another communication node 10, wherein the other communication node 10 used dynamic numbering for numbering the transmit slots of the burst transmission. The method 1400 includes receiving (Block 1402), from another communication node 10, a burst transmission on a secondary carrier that is operated in an unlicensed frequency band in aggregation with a primary carrier that is operated in a licensed frequency band.

Transmit slots of the secondary carrier align with transmit slots of the primary carrier, and the other communication node 10 dynamically numbers the transmit slots of the secondary carrier according to a burst numbering scheme that differs from a fixed numbering scheme used for numbering transmit slots of the primary carrier. Further, the burst numbering scheme references transmit slot numbering to the first transmit slot of the secondary carrier that is used by the other communication node 10 for transmission on the secondary carrier after a successful clear channel assessment for the secondary carrier or a prior transmission burst.

The method 1400 further includes determining (Block 1404), according to the burst numbering scheme, the transmit slot numbers assigned by the other communication node 10 to the transmit slots used on the secondary carrier for making the burst transmission, and setting (Block 1406) a slot-number dependent reception parameter for processing the received burst transmission, based on the determined transmit slot numbers. Further, the method 1400 includes processing (Block 1408) the received burst transmission according to the slot-number dependent reception parameter.

Figure 16:
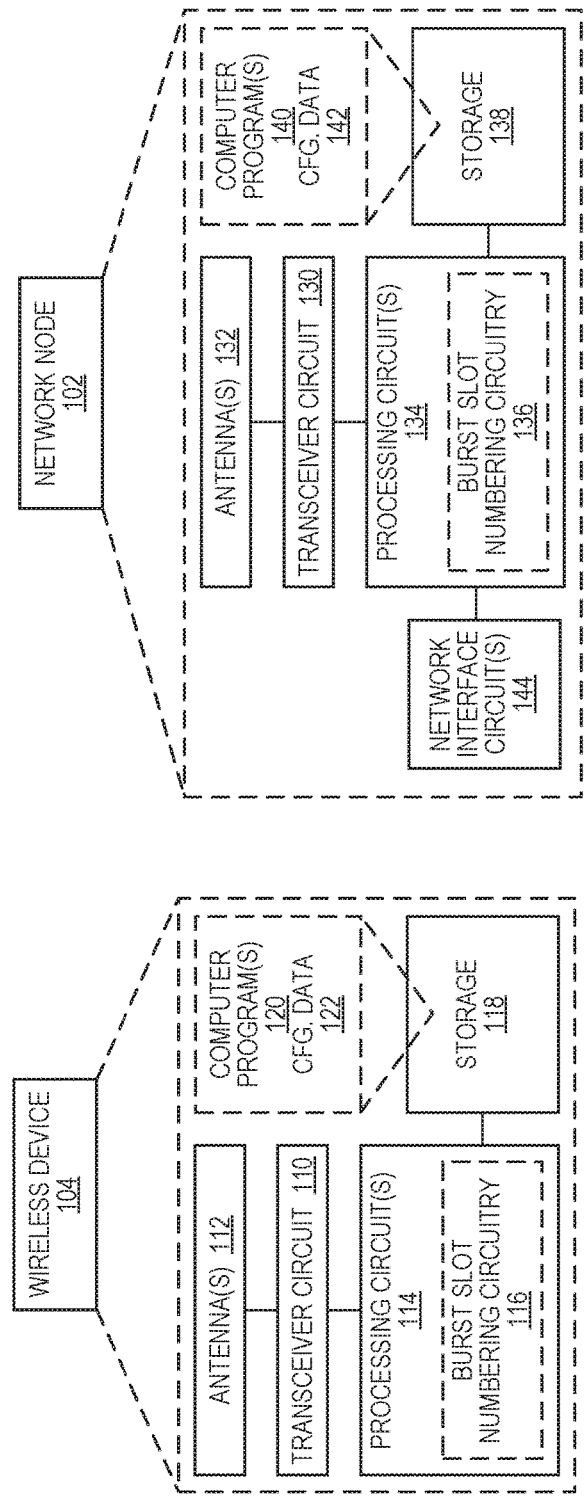
FIG. 16 is a block diagram of one embodiment of a wireless device configured to use burst slot numbering.

FIG. 16 illustrates another example embodiment of a wireless device 104 that may be configured according to the teachings herein as a communication node 10 that operates with dynamic numbering for receiving burst transmissions and/or making burst transmissions, on a secondary carrier that is operated in unlicensed spectrum and aggregated with a primary carrier that is operated in licensed spectrum. The wireless device 104 includes a transceiver circuit 110 and one or more associated transmit/receive antennas 112.

The transceiver circuit 110 comprises, for example, a cellular radio transceiver, and it is operatively associated with a processing circuit 114, which comprises or implements burst slot numbering circuitry 116. The burst slot numbering circuitry 116 performs dynamic numbering according to any one or more of the embodiments disclosed herein. The processing circuit 114 may be configured according to the execution of one or more computer programs 120 stored in storage 118, which is included in or is associated with the processing circuit 114. Further, it will be understood that the processing circuit 114 may comprise more than one device, circuit, and/or type of processing circuit, and that the storage 118 may comprise more than one type of memory or storage, and it may further contain one or more items of configuration data 122—such as data defining the burst numbering scheme(s) used by the wireless device 104, or related data, such as a device-specific offset value to be used when assigning the starting slot number value to a dynamically-numbered set of slots in a transmitted or received burst.

Figure 17:
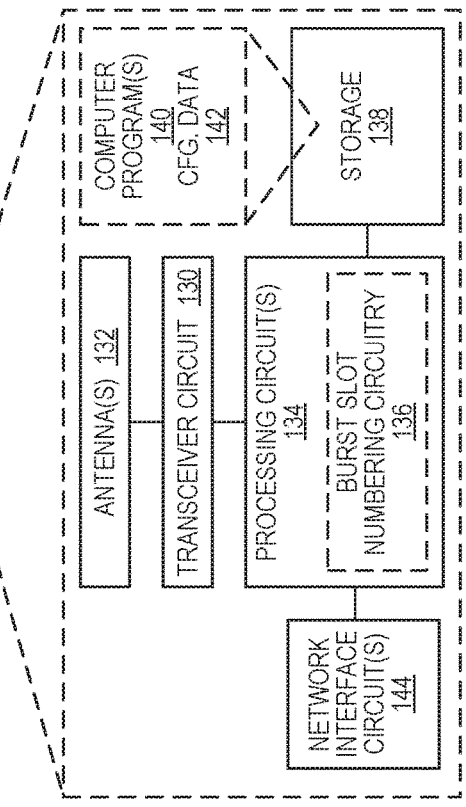
FIG. 17 is a block diagram of one embodiment of a network node configured to use burst slot numbering.

FIG. 17 illustrates another example embodiment of a network node 102 that may be configured according to the teachings herein as a communication node 10 that operates with dynamic numbering for receiving burst transmissions and/or making burst transmissions, on a secondary carrier that is operated in unlicensed spectrum and aggregated with a primary carrier that is operated in licensed spectrum. The network node 102 includes a transceiver circuit 130 and one or more associated transmit/receive antennas 132.

The transceiver circuit 130 comprises, for example, a cellular radio transceiver or pools of such circuitry, and it is operatively associated with a processing circuit 134, which comprises or implements burst slot numbering circuitry 136. The burst slot numbering circuitry 136 performs dynamic numbering according to any one or more of the embodiments disclosed herein. The processing circuit 134 may be configured according to the execution of one or more computer programs 140 stored in storage 138, which is included in or is associated with the processing circuit 134. Further, it will be understood that the processing circuit 134 may comprise more than one device, circuit, and/or type of processing circuit, and that the storage 138 may comprise more than one type of memory or storage, and it may further contain one or more items of configuration data 142—such as data defining the burst numbering scheme(s) used by the network node 102, or related data, such as a device-specific offset value to be used when assigning the starting slot number value to a dynamically-numbered set of slots in a transmitted or received burst. The network node 102 also may include one or more additional interface circuits 144, configured for communicating with one or more other network nodes.

Figure 18:
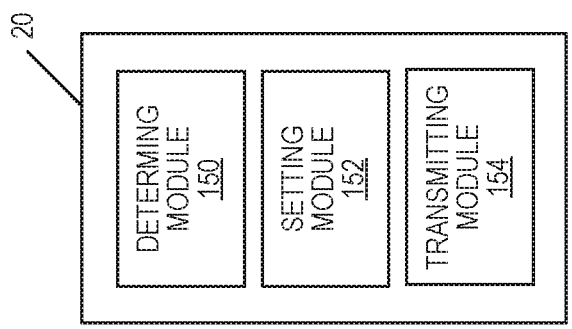
FIG. 18 is a block diagram of another embodiment of a wireless device configured to use burst slot numbering.

FIG. 18 illustrates one embodiment of the functional or physical circuitry implemented by a processing circuit 20 of a communication node 10, as configured according to the teachings herein, for dynamically numbering the transmit slots of a burst transmission made by the communication node 10 on a secondary carrier that is operated in unlicensed spectrum and aggregated with a primary carrier that is operated in licensed spectrum. The processing circuit 20 includes a determining module 150 that is operative to determine, according to a burst numbering scheme, the transmit slot numbers that will be assigned to the transmit slots used on the secondary carrier for making the burst transmission, a setting module 152 that sets a slot-number dependent transmission parameter for making the burst transmission, based on the determined transmit slot numbers, and a transmitting module 154 that performs the burst transmission on the secondary carrier according to the slot-number dependent transmission parameter. For example, the transmitting module 154 pre-computes scrambled data payloads for transmission in respective transmit slots of the burst transmission, based on its foreknowledge of the transmit slot numbers to be dynamically assigned to those transmit slots.

Figure 19:
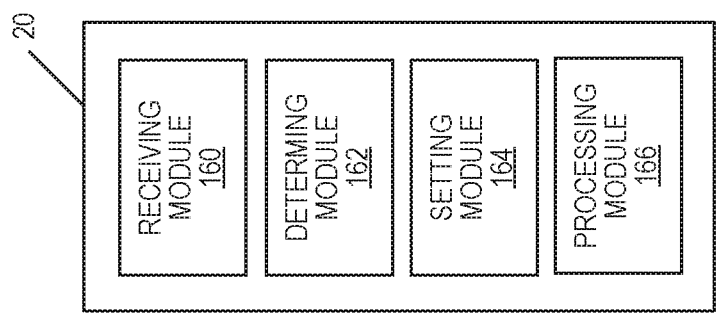
FIG. 19 is a block diagram of another embodiment of a network node configured to use burst slot numbering.

FIG. 19 illustrates one embodiment of the functional or physical circuitry implemented by a processing circuit 20 of a communication node 10, as configured according to the teachings herein, for dynamically numbering the transmit slots of a burst transmission received by the communication node 10 on a secondary carrier that is operated in unlicensed spectrum and aggregated with a primary carrier that is operated in licensed spectrum. The processing circuit 20 includes a receiving module 160 that is operative to receive signal samples or other data from the communication interface 16, where the received signal samples include a burst transmission having transmit slots that were dynamically numbered according a burst numbering scheme known to the transmitting circuit.

The processing circuit 20 further includes a determining module 162 that is configured to determine, according to the burst numbering scheme, the transmit slot numbers that were assigned to the transmit slots used on the secondary carrier for making the burst transmission. Further, the processing circuit 20 includes a setting module 164 that sets a slot-number dependent reception parameter for processing the received burst transmission, based on the determined transmit slot numbers. Correspondingly, the processing circuit 20 includes a processing module 166 that processes the received burst transmission according to the slot-number dependent transmission parameter. For example, the processing module 166 descrambles the scrambled data payloads in respective transmit slots of the burst transmission, based on its knowledge of the transmit slot numbers that were dynamically assigned to those transmit slots.

In view of the above, one of the several problems addressed by the teachings herein is the problem of not knowing a priori the slot number of the next transmission opportunity on the LAA SCell. This problem is solved by assigning a slot number (e.g., zero) to the first slot containing LAA SCell data transmission, and consecutively numbering subsequent slots within that transmission burst. More generally, among the several advantages associated with the teachings herein, consider the following examples: (a) on the DL, the LAA SCell can pre-compute the data payload including scrambling, without having to know beforehand when its LBT procedure will succeed; (b) on the UL, LAA UEs can pre-compute the data payload including scrambling, without having to know beforehand when their LBT procedure will succeed; and (c) processing time is saved because the scrambling code for a data payload does not need to be re-scrambled for each subframe due to identification of the slot number for which a transmission burst starts to transmit. The savings in processing time provides for a transmission to start in a same slot as a clear channel assessment or in a slot following a prior transmission burst.

Of course, the present invention is not limited to the above features and advantages. Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a communication node of performing a burst transmission on a secondary carrier that is operated in an unlicensed frequency band in aggregation with a primary carrier that is operated in a licensed frequency band, wherein transmit slots of the secondary carrier align with transmit slots of the primary carrier and wherein the method comprises:
dynamically numbering the transmit slots of the secondary carrier according to a burst numbering scheme that differs from a fixed numbering scheme used for numbering transmit slots of the primary carrier, wherein the burst numbering scheme references transmit slot numbering to a first transmit slot of the transmit slots of the secondary carrier that is used for transmission on the secondary carrier, after a successful clear channel assessment for the secondary carrier or a prior transmission burst,
wherein the dynamically numbering the transmit slots of the secondary carrier according to the burst numbering scheme comprises:
receiving an uplink grant for performing an uplink burst transmission;
assigning a starting slot number to the transmit slot of the secondary carrier in which the transmission of the uplink grant started;
computing the number of transmit slots spanned by a known grant delay, where the grant delay specifies the delay from receiving the uplink grant to starting the uplink burst transmission;
assigning the first transmit slot of the uplink burst transmission with the next incremental value in a numbering sequence that starts with the starting slot number and increments for each of the transmit slots spanned by the known grant delay, and
assigning successively incremented values to any further transmit slots used for the uplink burst transmission;
determining, according to the burst numbering scheme, the transmit slot numbers that will be assigned to the transmit slots used on the secondary carrier for the burst transmission;
setting a slot-number dependent scrambling sequence initialization parameter for the burst transmission, based on the determined transmit slot numbers; and
performing the burst transmission on the secondary carrier according to the slot-number dependent scrambling sequence initialization parameter.

2. The method of claim 1, wherein the method includes scrambling payload data for the burst transmission based on foreknowledge of the scrambling sequence, as gained from the determined transmit slot numbers.

3. The method of claim 1, wherein said dynamically numbering the transmit slots of the secondary carrier according to the burst numbering scheme comprises, responsive to the successful clear channel assessment, resetting the transmit slot numbering to a starting value, assigning the starting value to the first transmit slot of the secondary carrier used for the burst transmission, and assigning consecutively-incremented values to any subsequent transmit slots used for the burst transmission.

4. The method of claim 3, wherein the starting value is determined according to a node specific offset configured in the communication node.

5. The method of claim 1, wherein when the communication node comprises a network node of a wireless communication network, performing the burst transmission comprises performing a downlink transmission, and when the communication node comprises a wireless device of the wireless communication network, performing the burst transmission comprises performing an uplink transmission.

6. The method of claim 1, wherein the communication node is a wireless device operating in a wireless communication network, and wherein the burst transmission is an uplink burst transmission beginning in a transmit slot of the secondary carrier following completion of a downlink burst transmission on the secondary carrier, and wherein said dynamically numbering the transmit slots of the secondary carrier according to the burst numbering scheme comprises assigning slot numbers to the transmit slots of the uplink burst transmission that continue an incremental slot numbering used for the downlink burst transmission.

7. The method of claim 1, wherein the communication node comprises a wireless device operating in a wireless communication network, and wherein the burst transmission is the uplink burst transmission on the secondary carrier.

8. The method of claim 1, wherein performing the burst transmission on the secondary carrier according to the slot-number dependent transmission parameter comprises performing one or more clear channel assessments for the secondary carrier and beginning transmission of the burst transmission in the first slot of the secondary carrier following a determination that the secondary carrier is clear.

9. A communication node configured for operation in a wireless communication network and further configured to perform a burst transmission on a secondary carrier that is operated in an unlicensed frequency band in aggregation with a primary carrier that is operated in a licensed frequency band, wherein transmit slots of the secondary carrier align with transmit slots of the primary carrier, the communication node comprising:
a communication interface configured for transmitting on the secondary carrier;
a processing circuit operatively associated with the communication interface and configured to:
dynamically number the transmit slots of the secondary carrier according to a burst numbering scheme that differs from a fixed numbering scheme used for numbering transmit slots of the primary carrier, wherein the burst numbering scheme references transmit slot numbering to a first transmit slot of the transmit slots of the secondary carrier that is used for transmission on the secondary carrier, after a successful clear channel assessment for the secondary carrier or a prior transmission burst,
wherein the dynamically number the transmit slots of the secondary carrier according to the burst numbering scheme comprises:
receive an uplink grant for performing an uplink burst transmission;
assign a starting slot number to the transmit slot of the secondary carrier in which the transmission of the uplink grant started;
compute the number of transmit slots spanned by a known grant delay, where the grant delay specifies the delay from receiving the uplink grant to starting the uplink burst transmission;
assign the first transmit slot of the uplink burst transmission with the next incremental value in a numbering sequence that starts with the starting slot number and increments for each of the transmit slots spanned by the known grant delay, and assign successively incremented values to any further transmit slots used for the uplink burst transmission;
determine, according to the burst numbering scheme, the transmit slot numbers that will be assigned to the transmit slots used on the secondary carrier for the burst transmission;
set a slot-number dependent scrambling sequence initialization parameter for the burst transmission, based on the determined transmit slot numbers; and
perform the burst transmission on the secondary carrier according to the slot-number dependent scrambling sequence initialization parameter.

10. The communication mode of claim 9, wherein the processing circuit is configured to scramble payload data for the burst transmission based on foreknowledge of the scrambling sequence, as gained from the determined transmit slot numbers.

11. The communication node of claim 9, wherein the processing circuit is configured to dynamically number the transmit slots of the secondary carrier according to the burst numbering scheme, based on being configured to, responsive to the successful clear channel assessment, reset the transmit slot numbering to a starting value, assign the starting value to the first transmit slot of the secondary carrier used for the burst transmission, and assign consecutively incremented values to any subsequent transmit slots used for the burst transmission.

12. The communication node of claim 9, wherein when the communication node comprises a network node of the wireless communication network, the burst transmission is a downlink transmission, and when the communication node comprises a wireless device of the wireless communication network, the burst transmission is an uplink transmission.

13. The communication node of claim 9, wherein the communication node is a wireless device operating in the wireless communication network, and wherein the burst transmission is the uplink burst transmission beginning in a transmit slot of the secondary carrier following completion of a downlink burst transmission on the secondary carrier, and wherein the processing circuit is configured to dynamically number the transmit slots of the secondary carrier according to the burst numbering scheme by assigning slot numbers to the transmit slots of the uplink burst transmission that continue an incremental slot numbering used for the downlink burst transmission.

14. The communication node of claim 9, wherein the communication node comprises a wireless device configured for operation in the wireless communication network, and wherein the burst transmission is the uplink burst transmission on the secondary carrier.

15. The communication node of claim 9, wherein the processing circuit is configured to perform the burst transmission on the secondary carrier according to the slot-number dependent transmission parameter by performing one or more clear channel assessments for the secondary carrier and beginning transmission of the burst transmission in the first slot of the secondary carrier following a determination that the secondary carrier is clear.

16. The communication node of claim 9, wherein the starting value is determined according to a node-specific offset configured in the communication node.

17. A method in a communication node configured for operation in a wireless communication network, the method comprising:
- receiving, from another communication node, a burst transmission on a secondary carrier that is operated in an unlicensed frequency band in aggregation with a primary carrier that is operated in a licensed frequency band, wherein transmit slots of the secondary carrier align with transmit slots of the primary carrier, wherein the other communication node dynamically numbers the transmit slots of the secondary carrier according to a burst numbering scheme that differs from a fixed numbering scheme used for numbering transmit slots of the primary carrier, and wherein the burst numbering scheme references transmit slot numbering to a first transmit slot of the transmit slots of the secondary carrier that is used by the other communication node for transmission on the secondary carrier after a successful clear channel assessment for the secondary carrier or a prior transmission burst;
- wherein the transmit slots used for secondary carrier for making an uplink burst transmission comprises:
- assigning a starting slot number to the transmit slot of the secondary carrier in which the transmission of the uplink grant started;
- computing the number of transmit slots spanned by a known grant delay, where the grant delay specifies the delay from the wireless device receiving the uplink grant to the wireless device starting the uplink burst transmission;
- assigning the first transmit slot of the uplink burst transmission with the next incremental value in a numbering sequence that starts with the starting slot number and increments for each of the transmit slots spanned by the known grant delay, and assigning successively incremented values to any further transmit slots used for the uplink burst transmission;
- determining, according to the burst numbering scheme, the transmit slot numbers assigned by the other communication node to the transmit slots used on the secondary carrier for making the burst transmission;
- setting a slot-number dependent scrambling sequence initialization parameter for processing the received burst transmission, based on the determined transmit slot numbers; and
- processing the received burst transmission according to the slot-number dependent scrambling sequence initialization parameter.

18. The method of claim 17, wherein processing the received burst transmission comprises descrambling payload data from each transmit slot of the received burst transmission according to the scrambling sequence.

19. The method of claim 17, wherein determining, according to the burst numbering scheme, the transmit slot numbers assigned by the other communication node to the transmit slots used on the secondary carrier for making the burst transmission comprises setting the transmit slot numbering to a starting value, assigning the starting value to the first transmit slot of the secondary carrier used for the burst transmission, and assigning consecutively-incremented values to any subsequent transmit slots used for the burst transmission.

20. The method of claim 19, wherein the communication node is a network node in the wireless communication network, and wherein the burst transmission is an uplink burst transmission from a wireless device beginning in a transmit slot of the secondary carrier that follows completion of a downlink burst transmission on the secondary carrier, and wherein determining, according to the burst numbering scheme, the transmit slot numbers assigned by the wireless device to the transmit slots used on the secondary carrier for making the uplink burst transmission comprises referencing the transmit slot numbers to the starting value assigned to the first transmit slot of the downlink burst transmission, such that the slot number assigned to the first transmit slot of the uplink burst transmission continues the incremental slot numbering used for the downlink burst transmission.

21. The method of claim 17, wherein the communication node comprises a network node of the wireless communication network or a wireless device operating in the wireless communication network, and wherein, if the communication node comprises the network node, the burst transmission is the uplink transmission received at the network node, and wherein, if the communication node comprises the wireless device, the burst transmission is a downlink transmission received at the wireless device.

22. The method of claim 17, wherein the communication node comprises a network node operating in the wireless communication network, and wherein the burst transmission is the uplink burst transmission transmitted by a wireless device on the secondary carrier, and wherein determining, according to the burst numbering scheme.

23. The method of claim 17, wherein receiving the burst transmission comprises:
- receiving a signal containing the burst transmission;
- correlating the received signal with a comparison signal that is characteristic of the burst transmission; and
- determining that the received signal contains the burst transmission, based on correlation results obtained from the correlating step.

24. The method of claim 23, further comprising identifying a starting or first transmit slot of the burst transmission, based on the correlation results.

25. The method of claim 23, wherein the correlating step comprises correlating the received signal with a reservation signal that is characteristically transmitted by the other communication node in association with initiating or making burst transmissions on the secondary carrier.

26. The method of claim 25, wherein the reservation signal comprises at least one of: a Cell Reference Signal, CRS, a Primary Synchronization Signal, PSS, and a Secondary Synchronization Signal, SSS.

27. A communication node configured for operation in a wireless communication network and comprising:
- a communication interface configured to receive, from another communication node, a burst transmission on a secondary carrier that is operated in an unlicensed frequency band in aggregation with a primary carrier that is operated in a licensed frequency band, wherein transmit slots of the secondary carrier align with transmit slots of the primary carrier, wherein the other communication node dynamically numbers the transmit slots of the secondary carrier according to a burst numbering scheme that differs from a fixed numbering scheme used for numbering transmit slots of the primary carrier, and wherein the burst numbering scheme references transmit slot numbering to the first transmit slot of the secondary carrier that is used by the other communication node for transmission on the secondary carrier after a successful clear channel assessment for the secondary carrier or a prior transmission burst, wherein the transmit slot numbers assigned by the wireless device to the transmit slots used on the secondary carrier for making an uplink burst transmission by:
assigning a starting slot number to the transmit slot of the secondary carrier in which the transmission of the uplink grant started;
computing the number of transmit slots spanned by a known grant delay, where the grant delay specifies the delay from the wireless device receiving the uplink grant to the wireless device starting the uplink burst transmission;
assigning the first transmit slot of the uplink burst transmission with the next incremental value in a numbering sequence that starts with the starting slot number and increments for each of the transmit slots spanned by the known grant delay, and
assigning successively incremented values to any further transmit slots used for the uplink burst transmission;
a processing circuit operatively associated with the communication interface and configured to:
determine, according to the burst numbering scheme, the transmit slot numbers assigned by the other communication node to the transmit slots used on the secondary carrier for making the burst transmission;
set a slot-number dependent scrambling sequence initialization parameter for processing the received burst transmission, based on the determined transmit slot numbers; and
process the received burst transmission according to the slot-number dependent scrambling sequence initialization parameter.

28. The communication node of claim 27, wherein the processing circuit is configured to process the received burst transmission by descrambling payload data from each transmit slot of the received burst transmission according to the scrambling sequence.

29. The communication node of claim 27, wherein the processing circuit is configured to determine, according to the burst numbering scheme, the transmit slot numbers assigned by the other communication node to the transmit slots used on the secondary carrier for making the burst transmission, by setting the transmit slot numbering to a starting value, assigning the starting value to the first transmit slot of the secondary carrier used for the burst transmission, and assigning consecutively-incremented values to any subsequent transmit slots used for the burst transmission.

30. The communication node of claim 27, wherein the communication node comprises a network node or a wireless device configured for operation in the wireless communication network, and wherein, if the communication node comprises the network node, the burst transmission is an uplink transmission received at the network node, and wherein, if the communication node comprises the wireless device, the burst transmission is a downlink transmission received at the wireless device.

31. The communication node of claim 27, wherein the communication node is a network node configured for operation in the wireless communication network, and wherein the burst transmission is the uplink burst transmission from a wireless device beginning in a transmit slot of the secondary carrier that follows completion of a downlink burst transmission on the secondary carrier, and wherein the processing circuit is configured to determine, according to the burst numbering scheme, the transmit slot numbers assigned by the wireless device to the transmit slots used on the secondary carrier for making the uplink burst transmission by referencing the transmit slot numbers to a starting value assigned to the first transmit slot of the downlink burst transmission, such that the slot number assigned to the first transmit slot of the uplink burst transmission continues the incremental slot numbering used for the downlink burst transmission.

32. The communication node of claim 27, wherein the communication node comprises a network node configured for operation in the wireless communication network, and wherein the burst transmission is the uplink burst transmission transmitted by a wireless device on the secondary carrier.

33. The communication node of claim 27, wherein the processing circuit is configured to receive the burst transmission, based on being configured to:
receive a signal containing the burst transmission;
correlate the received signal with a comparison signal that is characteristic of the burst transmission; and
determine that the received signal contains the burst transmission, based on correlation results obtained from the correlating step.

34. The communication node of claim 33, wherein the processing circuit is configured to identify a starting or first transmit slot of the burst transmission, based on the correlation results.

35. The communication node of claim 33, wherein the processing circuit is configured to correlate the received signal with a reservation signal that is characteristically transmitted by the other communication node in association with initiating or making burst transmissions on the secondary carrier.

36. The communication node of claim 35, wherein the reservation signal comprises at least one of: a Cell Reference Signal, CRS, a Primary Synchronization Signal, PSS, and a Secondary Synchronization Signal, SSS.

* * * * *